United States Patent [19]

Weiler et al.

[11] 4,425,294

[45] * Jan. 10, 1984

[54] METHOD FOR MOLDING AND FILLING A DISPENSING CONTAINER HAVING ONE OR MORE REMOVABLE CLOSURE MEANS UNITARY THEREWITH

[75] Inventors: Gerhard H. Weiler, South Barrington; Henry Komendowski, Des Plaines, both of Ill.

[73] Assignee: Automatic Liquid Packaging, Inc., Arlington Heights, Ill.

[*] Notice: The portion of the term of this patent subsequent to Dec. 16, 1997 has been disclaimed.

[21] Appl. No.: 317,296

[22] Filed: Nov. 2, 1981

Related U.S. Application Data

[60] Continuation-in-part of Ser. No. 117,455, Feb. 1, 1980, Pat. No. 4,298,045, which is a division of Ser. No. 896,978, Apr. 17, 1978, Pat. No. 4,239,726.

[51] Int. Cl.³ .............................................. B29C 17/07
[52] U.S. Cl. .................................... 264/525; 425/524; 425/525
[58] Field of Search ............... 264/524, 525; 425/524, 425/525

[56] References Cited

U.S. PATENT DOCUMENTS

| | | | |
|---|---|---|---|
| 3,577,291 | 5/1971 | Uchida | 264/524 X |
| 3,597,793 | 8/1971 | Weiler et al. | 425/524 X |
| 3,728,063 | 4/1973 | Langecker | 264/524 X |
| 4,118,452 | 10/1978 | Myers et al. | 425/530 X |
| 4,217,328 | 8/1980 | Cambid, Jr. | 264/524 X |
| 4,239,726 | 12/1980 | Weiler et al. | 264/525 |

Primary Examiner—Jan H. Silbaugh
Attorney, Agent, or Firm—Dressler, Goldsmith, Shore, Sutker & Milnamow, Ltd.

[57] ABSTRACT

A method for forming a unitary, hermetically sealed dispensing container wherein a first mandrel is provided to blow-mold the container and wherein a second mandrel is provided for subsequently filling the formed container.

3 Claims, 6 Drawing Figures

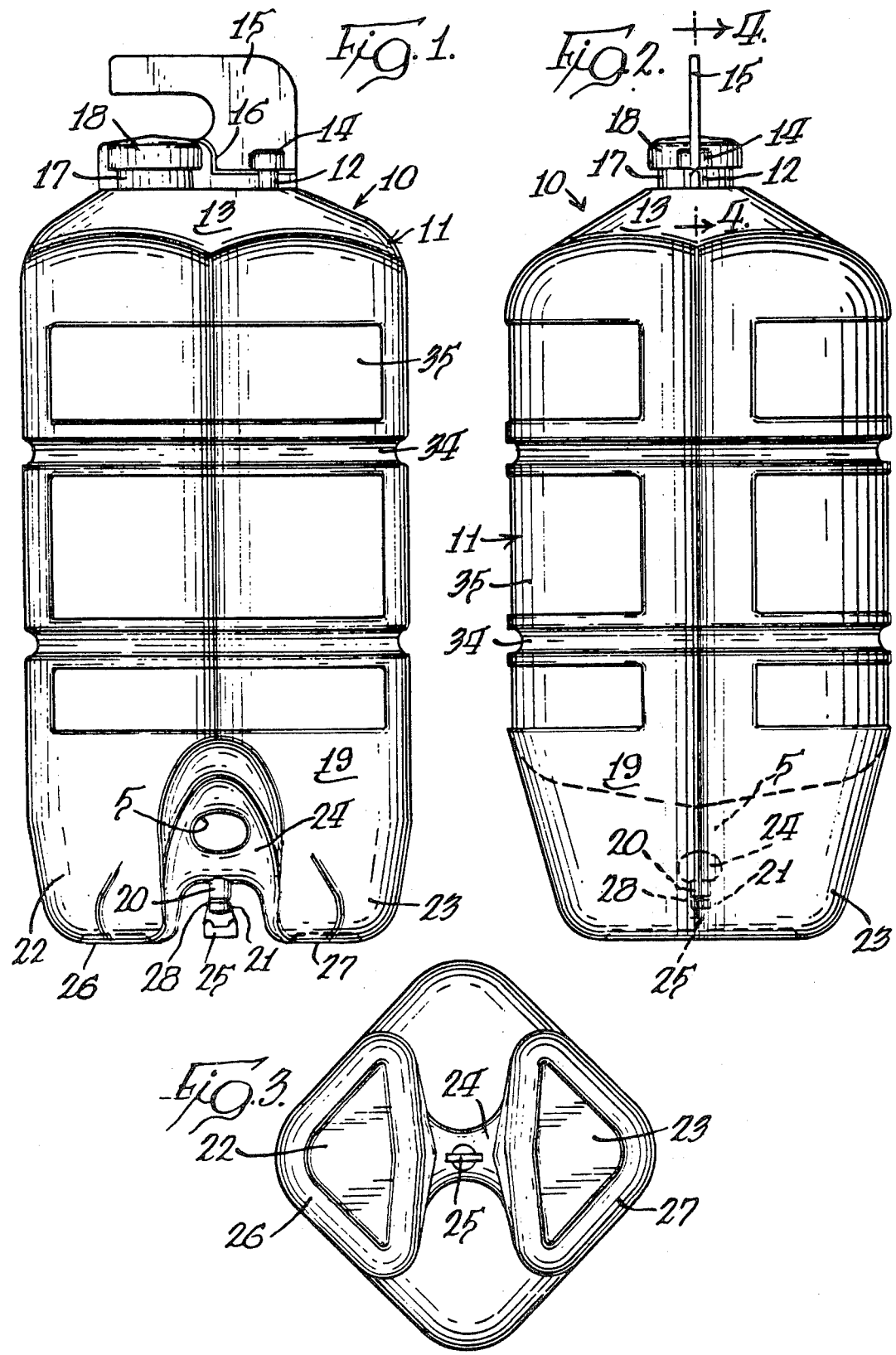

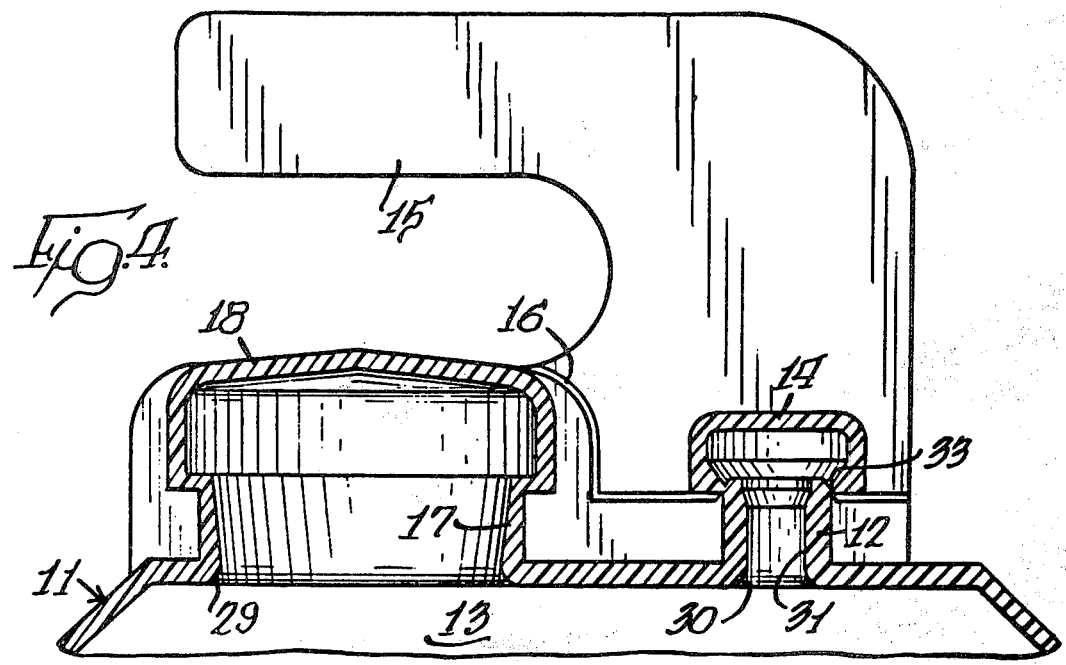
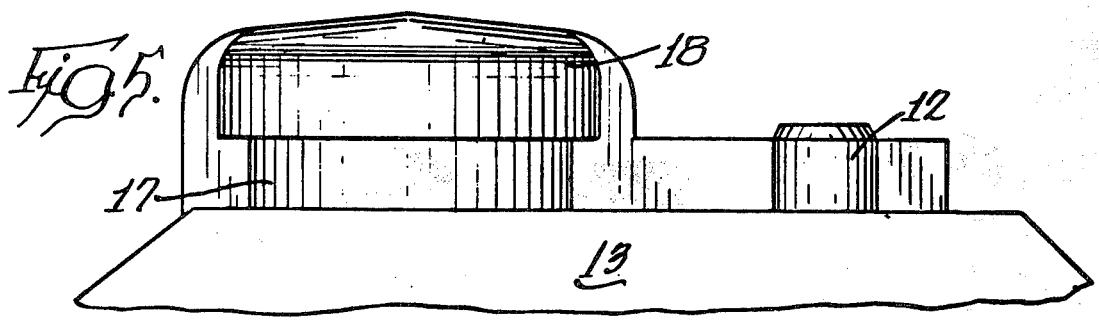
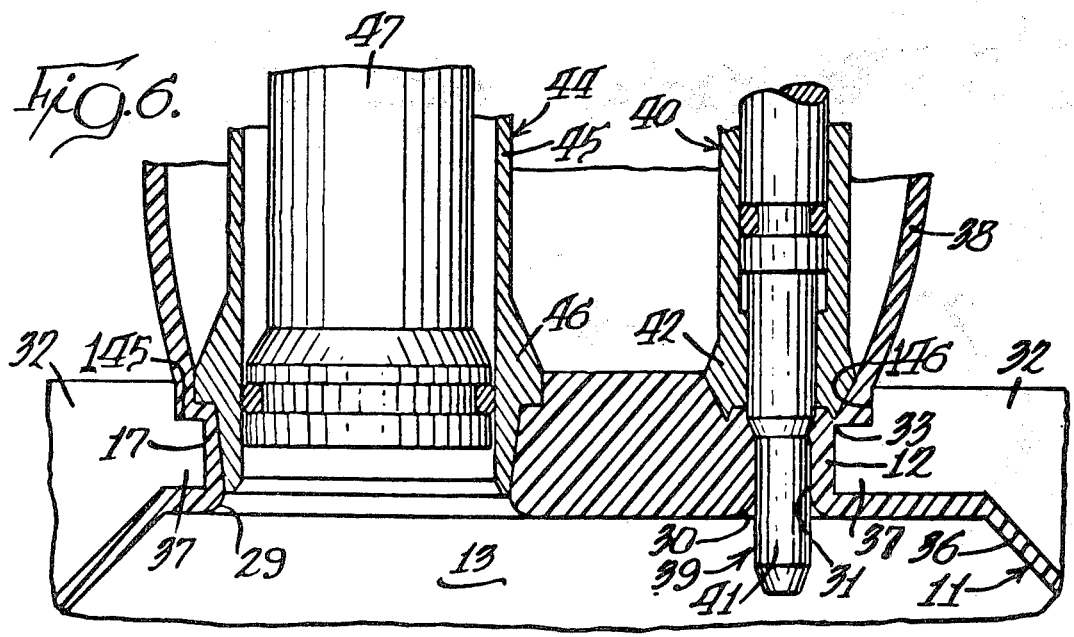

ical Field

This invention relates, in general, to methods for blow molding and filling an article.

BACKGROUND OF THE INVENTION

Packaging systems that blow mold, fill, and seal containers such as bottles, bags, and the like, enjoy widespread commercial acceptance because of ease of fabrication and reduced labor costs. Moreover, such a packaging system obviates the need for costly auxiliary equipment that cleans and handles empty containers, fills the containers, and subsequently seals the filled containers. A packaging system of the foregoing type is disclosed in U.S. Pat. No. Re. 27,155 to Hansen.

Since the complete filling cycle for a container takes place in an enclosed environment when the aforementioned form, fill, and seal packaging system is employed, this system is well-suited for sterile and aseptic packaging of parenteral solutions and the like substances. However, for such solutions it is desirable to provide a container having an access aperture of controlled dimensions that can receive a draining spike without undesirable leaking when it is desired to drain the container contents. For non-collapsible containers it is also desirable to provide a venting aperture provided with an outwardly projecting stem or boss of controlled outside dimensions so that an air filter can be conveniently mounted thereon when the container contents is drained.

Heretofore, it has not been possible to consistently attain the requisite dimensional control in a unitary blow-molded container, particularly for internal dimensions. The present invention, however, provides unitary dispensing containers having access apertures and unitary, externally projecting members of predetermined, relatively closely controllable dimensions.

Heretofore, a single mandrel (containing a gas blowing nozzle or port and a filling liquid discharge nozzle or port) has been used for both blow molding a container and then filling the container. Typically, the mandrel is incorporated in an apparatus for automatically and repeatedly blow molding and filling containers seriatim.

It has been found, however, that in some high-speed production runs, drops of the liquid product with which the containers are filled may cling to the liquid discharge nozzle or other parts of the mandrel after a container is filled with the liquid. When the next container is blow molded with the same mandrel, some of the drops of liquid on the mandrel may fall off, or be blown off, of the mandrel and into the container during its formation from hot, soft thermoplastic material in the blow molding step. This can lead to cratering or pitting of the thermoplastic material that forms the inside surface of the blow-molded container. Accordingly, it would be desirable to provide a method for blow molding and then filling containers in a manner that substantially eliminates such cratering or pitting problems.

SUMMARY OF THE INVENTION

The present invention provides a method for forming unitary, hermetically sealed dispensing containers, including a container having a plurality of access apertures of controlled internal and/or external dimensions and sealed by means of removable closures that are unitary with the container. A preferred form of the container comprises a hollow, generally tubular body or shell of thermoplastic material closed at both ends. The container is provided at one end with a first access aperture surrounded by a first hollow stem means or neck portion unitary with the container and having a bore of predetermined configuration, and at the other end with a second access aperture surrounded by a second hollow stem means or neck portion unitary with the container and having an outer side surface of predetermined configuration. First and second removable closure means, unitary with the respective hollow stem means, and joined thereto by means of annular frangible webs, hermetically seal the container until such time when the container contents is to be withdrawn.

Each removable closure means can be provided with a unitary tab means so as to facilitate the removal of the closure means.

In order to substantially eliminate cratering or pitting problems discussed above in the section entitled "Background of the Invention", the preferred form of fabricating a container according to the teachings of the present invention is to use a separate mandrel for blow molding the container and a separate mandrel for subsequently filling the container with liquid contents. If desired, the container may also be formed with one or more access apertures having weakened flanges connecting individual closures for the access apertures to the container body. The access apertures and weakened flanges may be first formed in the parison with special mandrels equipped with suitable extensible compression molding members or may be formed by suitable extensible compression molding members associated with the separate blow molding and filling mandrels. Alternatively, one access aperture and associated frangible web may be formed with a suitable extensible compression molding member associated with the blow molding mandrel while another access aperture and associated frangible web may be formed with a special mandrel, separate from the filling mandrel, that has an extensible compression molding member.

The method of this invention resides in the combination of unique process steps for, inter alia, rapidly blow molding and then filling an article with liquid contents. The method of the present invention offers a number of advantages and eliminates a number of disadvantages heretofore associated with the blow molding of an article.

The features of the present invention will be readily understood and important features other than those specifically enumerated above will become apparent when consideration is given to the following detailed description which, when taken in conjunction with the drawings, describes, discloses, illustrates, and shows preferred embodiments of the present invention and what is presently believed to be the best mode of practicing the principles of the invention. Other embodiments and modifications may be suggested to those having benefit of the teachings herein, especially as they fall within the scope and spirit of the claims.

BRIEF DESCRIPTION OF THE DRAWINGS

In the drawings,

FIG. 1 is a front elevational view showing a novel dispensing container;

FIG. 2 is a side elevational view of the dispensing container shown in FIG. 1;

FIG. 3 is a bottom view of the dispensing container shown in FIG. 1;

FIG. 4 is a fragmentary sectional view, on an enlarged scale, taken along plane 4—4 in FIG. 2;

FIG. 5 is a fragmentary elevational view, on an enlarged scale, depicting one end of the container shown in FIG. 1 after this container has been opened; and FIG. 6 is a fragmentary sectional view, similar to the view shown in FIG. 4, but depicting the container at an intermediate fabrication stage.

DESCRIPTION OF PREFERRED EMBODIMENTS

This invention may be used in many different forms. The specification and accompanying drawings disclose specific embodiments as an example of the use of the invention. The invention is not intended to be limited to the embodiments illustrated, and the scope of the invention will be pointed out in the appended claims.

The precise shapes and sizes of components herein described are not essential to the invention unless otherwise indicated. Unless otherwise indicated, the particular shapes and sizes are shown to best illustrate the principles of the invention.

For ease of description, the container illustrated in the drawings is described in a normal (upright) position and terms such as upper, lower, horizontal, etc., are used with reference to this position. It will be understood, however, that the container may be manufactured, stored, transported, used, and sold in an orientation other than the position described.

Apparatus for fabricating the container described herein has certain conventional components, including conventional drive mechanisms and control mechanisms, the details of which, though not fully illustrated or described, will be apparent to those having skill in the art and an understanding of the necessary functions of such mechanisms.

Referring to FIGS. 1 and 2, dispensing container 10 can be made utilizing the general blow molding, filling and sealing techniques taught in U.S. Pat. No. Re. 27,155 to Hansen. However, these techniques are modified in certain respects, as will be discussed in detail hereinbelow, in order to make possible the fabrication of the containers embodying certain novel features. In addition, new techniques can be used to facilitate fabrication of the container 10 to eliminate certain disadvantages heretofore associated with blow molding and filling processes.

Container 10 comprises a hollow, generally tubular body or elongated shell 11 closed at both ends and defines a sealed enclosure. At upper end 13 of container 11 there is provided a container neck portion in the form of first hollow stem or collet 12 surrounding access aperture 30 (FIG. 4) and suitable as a contents-filling and/or withdrawing port. Collet 12 is unitary with shell 11, is provided with bore 31 having a predetermined configuration, e.g., a controlled inside diameter and/or cross section, and at the distal end thereof is removably closed with cap 14 unitary with collet 12. Cap 14 is joined to collet 12 by means of a frangible web 33 (FIG. 4) that is unitary with cap 14 as well as with collet 12. Cap 14 is provided with tab 15, unitary with cap 14 and shell 11, for facilitating the removal of cap 14 from collet 12. In the embodiment shown in FIGS. 1 and 2, tab 15 is generally L-shaped and is larger than cap 14 in order to provide for easy gripping and leverage when container 10 is opened by twisting off cap 14. After opening, upper end 13 of container 10 assumes the configuration shown in FIG. 5 with the open end of collet 12 ready to accept a draining spike.

If desired, and in order to minimize the likelihood of an inadvertent and premature removal of cap 14, tab 15 is connected to shell 11 by means of a substantially coplanar, relatively thin, frangible web 16 that is readily broken as tab 15 is twisted.

While container 10 can be filled during the fabrication thereof through bore 31 of hollow stem or collet 12, for a relatively larger container the filling time, and thus total fabrication time, can be considerably reduced by providing an auxiliary filling aperture. Such an aperture can be aperture 29, defined by filling aperture neck portion or collet 17, which is permanently sealed after container 10 has been filled to the desired extent, for example, by permanent cap 18 that is molded unitary with collet 17.

Lower end 19 of container 10 is provided with an access aperture, suitable as a venting aperture or the like, surrounded and defined by a neck portion such as hollow stem or collet 20 which has a predetermined outer side surface configuration and which terminates in a unitary but removable sealing cap 21, joined to stem 20 by means of frangible web 28. If desired, sealing cap 21 can be provided with grippable tab 25 for easy removal.

The dimensions of the outer side surface of stem 20 can be controlled during fabrication of the container, as will be discussed in detail hereinbelow, so that stem 20 can accept and frictionally hold an air filter housing or a similar appurtenance. Preferably stem 20 is slightly tapered toward its distal end.

During the dispensing of parenteral solutions, container 10 is usually situated in an inverted position. In order to provide an integral hanger hole for this container, container lower end 19 can be bifurcated during fabrication so as to provide paired pockets 22 and 23 that are bridged by unitary sleeve member or tubular connector 24 which, in turn, defines a confined flow passageway between pockets 22 and 23 and, together with portions of the container walls defining pockets 22 and 23, also defines hanger hole 5.

Inasmuch as during storage container 10 normally is in an upright position as shown in FIGS. 1 and 2, it is desirable to build into the container bottom some substantially planar surface on which the container can rest. To this end, the distal portions of pockets 22 and 23 can be flattened to provide substantially coplanar lands such as the substantially triangular lands 26 and 27 illustrated in FIG. 3.

In order to permit the upright storage of container 10 in instances when sealing cap 21 is provided with a tab means such as tab 25, tubular connector member or sleeve 24 is spaced inwardly from the plane defined by lands 26 and 27, and hollow stem 20 is made unitary with sleeve 24. The dimensions of stem 20, cap 21 and tab 25, as well as the spacing of sleeve 24 from the plane defined by lands 26 and 27, of course, is selected so as to allow container 10 to rest on lands 26 and 27 when in an upright position.

As further illustrated in FIG. 4, access aperture 30 at the upper end 13 of shell 11 serves as a container contents-withdrawing aperture and is surrounded by collet 12 which serves to hold means for withdrawing the container contents. Bore 31 in collet 12 is of a predetermined inside diameter and is adapted to receive and frictionally engage in a sealing relationship a draining spike or similar draining means. Bore 31, and thus aperture 30, are removably sealed by cap 14 that is connected to collet 12 via frangible annular web or weakened flange 33.

A further access aperture, suitable for filling the container, is illustrated by aperture 29 surrounded by collet 17 and permanently closed, after filling, by means of cap 18 unitary with collet 17. As pointed out before, a filling aperture such as aperture 29 is not necessary for containers of relatively small capacity inasmuch as such containers can be readily filled during fabrication via the access aperture that ultimately serves as the container contents-withdrawing aperture. However, the filling rate for larger containers can be substantially increased if an additional filling aperture, larger than the contents-withdrawing aperture, is utilized.

Rigidity of relatively large containers can be enhanced by providing rigidifying ribs or indentations in the side walls thereof. To this end rigidifying indentations such as grooves 34 and embossments 35 are provided in the side walls of container shell 11.

To fabricate the dispensing containers of the present invention, any blow-moldable thermoplastic material compatible with the product to be packaged can be utilized. Typical illustrative thermoplastic materials that are suitable are the usual blow-molding grade materials such as high-density polyethylene, low-density polyethylene, polypropylene, and the like.

Containers embodying the present invention can be readily fabricated by blow molding and filled utilizing the general forming, filling and sealing technique disclosed in U.S. Pat. No. Re. 27,155 to Hansen, the disclosure of which is incorporated herein by reference to the extent pertinent, as modified by certain refinements described hereinbelow. Further description of the general fabrication technique, and in particular the technique for making weakened flange connections, i.e., the frangible webs, that join the removable closure means to their respective collets or stems can be found in U.S. Pat. No. 3,597,793 to Weiler et al. and is incorporated herein by reference to the extent pertinent.

In general, the fabricating apparatus includes a parison extruder, a mold comprised of movable mold portions for forming the main body portion of the container (including the bottom part thereof), the container neck portion, and the sealing cap portions, holding jaws for retaining a segment of an extruded parison in a predetermined position with respect to the various mold portions, parison cutting means, and a mandrel for blow-forming the container and then filling the container. Associated with the mandrel are means cooperating with the mold portions forming the container neck portion or collet to provide a weakened flange connection between the container neck portion and a unitary sealing cap or similar closure means for the container.

To fabricate a container in general, a parison in the form of a hollow tube is extruded from the extruder and situated between the movable mold portions when the latter are in an open position. When a required length of the parison has been extruded, the mold portions for forming the main body portion of the container (sometimes also called the lower mold portions) are closed about the extruded parison so as to pinch together and close the lower end of the extruded parison and to constrict the upper end of the parison portion confined within the closed mold portions. The mold portions forming the container neck portion may be separately movable or they may be unitary with the mold portions for forming the main body portion of the container. At substantially the same time parison holding jaws are moved into position so as to grasp the upper end of the extruded parison and to hold the same in an open position while a predetermined length of the extruded parison is severed and the main body portion of the container is formed and subsequently filled.

To form and then fill the formed container, a mandrel that includes a blowing tube and a filling tube is positioned within the open end of the extruded parison so as to pinch a peripheral constricted portion of the open end against the now-closed mold portions and provide a substantially gas tight seal therebetween. Thereafter, that portion of the extruded parison situated within the cavity defined by the closed mold portions is inflated by a burst of gas, e.g., air or the like, and pressed against the walls of the mold cavity. At substantially the same time, a metered quantity of the intended container contents is introduced into the inflated parison portion that has assumed the configuration of the container body as a result of the aforementioned inflation. The introduced container contents usually is at a relatively lower temperature than the parison and assists in solidifying the walls of the formed container. At about the same time, the gas utilized to inflate the container is discharged to the outside through appropriate venting ducts provided in the mandrel for that purpose.

After the formed container has been filled to the desired degree, the mandrel is withdrawn from the open end of the parison and the container sealed by the action of mold portions for forming the container closure, i.e., the upper mold portions, which are brought together and pinch shut the open end of the parison. Thereafter all mold portions, as well as the holding jaws, open and the formed, filled and sealed container drops out or is removed from the fabricating apparatus.

To form weakened flange connections between the container neck portion and the container closure means, the mandrel in the apparatus generally described hereinabove is provided with means that cooperate with the mold portions that form the container neck portion or collet together with a base portion of the closure means as described in detail in the aforementioned U.S. Pat. No. 3,597,793 to Weiler et al.

To fabricate the containers embodying the present invention, the mold portions and the mandrel are specially designed to provide for substantially simultaneous compression molding of the container neck portion or collet with a bore having predetermined inside dimensions. For this purpose, the mandrel is provided with an elongated compression molding member that enters the constriction formed in the extruded parison by either neck portion mold parts that are integral with the lower mold parts or by auxiliary, separately movable neck portion mold parts that are associated with the lower mold parts, and compression molds a bore within the container neck portion or collet before the formed container is filled and capped.

A dispensing container embodying the present invention can be formed, filled and sealed using an open assembly of mold parts that define a container-forming cavity and that are provided with means for constricting a predetermined portion of a parison. A parison of a thermoplastic material is then extruded between the open assembly of mold parts as a semi-solid, elongated, hollow tube, and the mold parts are closed about the parison so as to confine a portion therebetween and within the container-forming cavity. One end of confined parison portion is pinched closed, and the other end of the confined parison portion is deformed so as to provide a constriction with an access aperture into the confined parison portion.

Thereafter a predetermined length of the extruded parison is severed so as to provide an open-ended parison portion that is unitary with the confined parison portion and extends above the latter. Severing of the parison can be readily achieved using a wire cutter means or the like while the parison is held between vacuum-assisted holding jaws in a known manner.

After a predetermined length of the extruded parison has been severed, the formed access aperture is temporarily sealed with a mandrel equipped with an elongated, extensible compression molding member and with an annular molding surface that coacts with the mold parts so as to form a weakened flange. The mandrel is applied to the constriction surrounding the access aperture so that the weakened flange is formed about the constriction between what ultimately becomes the container neck portion or collet and the base portion of the cap means.

Thereafter the elongated compression molding member is extended into the constriction to form a container neck portion or collet having a bore of predetermined configuration and communicating with the access aperture. The produced bore is adapted to receive and engage in a sealing relationship a draining spike or a similar implement for withdrawing the contents of the container.

The confined parison portion is blow-formed into a container conforming to the configuration of the mold cavity by pressurizing the confined parison portion either through the aforementioned access aperture or through a second aperture provided in the confined parison portion in a similar manner as the mold parts are closed about the parison. The second aperture can also have associated therewith a compression-molded neck portion, if desired. The formed container body is filled with a desired contents utilizing either or both of the aforementioned access apertures.

When the forming and filling operations are completed, the mandrel is removed from the constriction, closure forming mold parts are provided about the open-ended parison portion and operated so as to form a closure for the compression-molded bore that is joined to the container neck portion by the weakened flange.

By way of example, the formation of a collet having a bore of controlled inside diameter is shown in FIG. 6. In this particular embodiment lower mold part 32 is machined to provide container body cavity 36 and inwardly-extending peripheral flange 37 capable of constricting open end 38 of the extruded parison and serving also as the mold part for forming the container neck portion or collet. Grooves 145 and 146 in flange 37 are adapted to form a base portion for unitary caps 18 and 14, respectively.

In this particular example, flange 37 is shaped so as to cooperate with a corresponding flange on the mold part opposing mold part 32 and to pinch together predetermined opposite portions of the extruded parison in central region of end 38 thereof, thereby substantially simultaneously providing apertures 29 and 30 in upper end 13 of container shell 11.

The desired inside dimensions for bore 31 of collet 12 are produced by the action of elongated compression molding member or ram 39 that is carried within mandrel 40. Ram 39 can be extended from within mandrel 40 so as to enter and shape bore 31. Preferably ram 39 is cylindrical; however, ram side surface 41 can be machined to any desired cross-section, e.g., round, triangular, square, etc., and the ram can have any desired configuration, e.g., straight, tapered, stepped, or the like.

As illustrated in FIG. 6, mandrel 40 is also provided with an annular, ring-shaped molding surface 42 that serves to form frangible annular web 33 around collet 12 as taught in the aforementioned U.S. Pat. No. 3,597,793 to Weiler et al. If desired, mandrel 40 can also be equipped with container blowing and filling nozzles that are coaxial with ram 39 in which case aperture 30 can serve the dual functions as a filling aperture and as a container contents-withdrawing aperture. However, in such cases the filling nozzle has a relatively small opening and for containers having a capacity in excess of about 10 milliliters the filling rate becomes a factor limiting the container production rate. Accordingly, for the fabrication of relatively larger containers it is preferable to provide an auxiliary filling aperture such as aperture 29 surrounded by collet 17 that is compression molded by mandrel 44 to the desired configuration. Mandrel 44 comprises blowing tube 45 that terminates in ring-like molding ram 46, which determines the inside dimensions for the bore of collet 17, and filling tube 47 situated within blowing tube 45 and in a telescoping relationship therewith.

Mandrels 40 and 44 are brought into open end 38 of the extruded parison, preferably substantially simultaneously in order to minimize fabrication time. However, mandrels 40 and 44 can be actuated individually, if desired.

After collets 12 and 17 have been formed, mandrels 40 and 44 are withdrawn and the filled container is sealed by the action of appropriate mold parts as taught in U.S. Pat. No. Re. 27,155 to Hansen and U.S. Pat. No. 3,597,793 to Weiler et al. The tabs, such as tab 15 for cap 14 can be conveniently molded during the container sealing operation by providing appropriate cutting edges in the mold parts that are brought together to pinch closed open end 38 of the extruded parison. Frangible coplanar web 16 that serves as securement means for tab 15 can also be molded at the same time, if desired, by providing an appropriate mold protuberance of projecting edge which gives the desired configuration for web 16, for example, as shown in FIG. 4.

The dimensions and configuration of the external side surfaces of hollow stem or collet 20 at lower end 19 of container 10 (FIGS. 1, 2, and 3) are determined by the dimensions of the corresponding mold cavities in the lower mold portions. Vacuum passages usually are provided in the lower mold portions that define the cavity for collet 20 so as to permit the necessary control of the outside dimensions thereof.

In the method for forming a container described above with reference to FIG. 6, either of the mandrels 40 and 44 could include both the blowing means (e.g., nozzle, tube or port) and the filling means (e.g., nozzle, tube, or port) by which the container is first blow molded and is then subsequently filled. In some situations, one or more drops of the filling liquid may remain on the end of the filling nozzle or other parts of the mandrel regardless of which of the mandrels 40 and 44 is used for blow molding and filling the container.

After a first formed container is sealed and removed, the mandrel is typically positioned to blow mold and fill a second or subsequent container. During the blow molding of the subsequent container, the drops of filling liquid clinging to the end of the mandrel (or to the filling nozzle in the mandrel) may fall, or be blown, into the container and against the hot, soft, thermoplastic material forming the inside of the container. This will cause cratering or pitting of the container interior walls.

In order to substantially eliminate the above-described cratering or pitting problem, a separate mandrel should be used for blow molding the container and that a separate mandrel should be used for filling the container. The blow molding mandrel, which at least has a blowing means (e.g., nozzle, tube, or port), may *also* function to form the access apertures and frangible annular webs as described above. A separate mandrel is then provided with a liquid filling means (e.g., nozzle, tube, or port) for the purpose of discharging the liquid to fill the container. Any drops of liquid remaining on the separate filling mandrel nozzle present no problem during the blow molding formation of a subsequent container. Since the subsequent container is blow molded by the separate mandrel from which no liquid is discharged, there are no liquid drops present on the blow molding mandrel that might otherwise fall or be blown into the soft thermoplastic material defining the walls of the container.

When one mandrel is used for blow molding and another, separate mandrel is used for filling the container with liquid, both of the mandrels may be sequentially operated through only *one* access aperture. That is, the single access aperture is first formed in the parison (as with a first mandrel that may or may not include a blow molding blowing nozzle). Next, the container is blow molded with the first mandrel (or with another blow molding mandrel) through the single aperture. The container is subsequently filled with liquid contents by another, separate mandrel through the same aperture after the blow molding mandrel hs been removed.

Alternatively, *two* separate access apertures can be provided or formed in the container by two suitable forming mandrels. One of the two mandrels can include a blow molding nozzle so that the container can be first blow molded through one aperture with the blow molding mandrel. The second aperture can be formed in the container simultaneously with the first aperture by means of a special forming member or mandrel, such as mandrel 40 (FIG. 6), that does *not* incorporate a filling nozzle. Removal of the forming member or mandrel from the second aperture permits a separate filling mandrel to be positioned in the second aperture to subsequently fill the container.

In still another alternative, two apertures may be formed in the container by two mandrels simultaneously and with one of the two mandrels including a blow molding nozzle and with the other of the two mandrels including a filling nozzle. The container may then be first blow molded through one aperture with one of the mandrels and then filled through the second aperture by means of the other mandrel.

In any of the above-described forms of the novel method of the present invention involving a container with two or more apertures, the aperture through which the container is first blow molded may be smaller than the aperture through which the container is subsequently filled. On the other hand, if desired, the aperture through which the container is first blow molded may be larger than the aperture through which the container is subsequently filled.

It is to be realized that existing conventional apparatus may be modified for effecting the above-described methods of using two mandrels—one for blow molding and one for filling. Specifically, each of the two mandrels may be of a conventional design that includes *both* a blowing means and a filling means. However, in such a situation, the filling means on one mandrel must be rendered *inoperative* whereas the blowing means on the other mandrel must be rendered *inoperative*.

The foregoing specification and the drawings are intended as illustrative and are not to be taken as limiting. Still other variations within the spirit and scope of this invention are possible and will readily present themselves to one skilled in the art.

It is claimed:

1. In a method for forming and filling a container made from a thermoplastic material in which a first mandrel is provided for blow molding a container, in which an assembly of mold parts is provided for defining a container-forming cavity, and in which the blow-molded container is filled with liquid while within the assembly of mold parts, the improvement comprising the steps of:
   (a) providing said first mandrel with blowing means for blow molding the container and providing a second mandrel with a filling means, that is separate from said first mandrel for discharging liquid into the formed container to fill the container;
   (b) engaging said thermoplastic material with said first mandrel to form a first aperture and at about the same time with said second mandrel to form a second aperture;
   (c) blow molding the container with the blowing means of the first mandrel through said first aperture;
   (d) filling the blow-molded container from said filling means of said second mandrel through said second aperture; and
   (e) thereafter forming individual closures for said first and second apertures that are unitary with the container.

2. A method for forming, filling and sealing a container made from a thermoplastic material, said method comprising the steps of:
   (a) providing an open assembly of mold parts defining a container-forming cavity and providing means for constricting a parison;
   (b) extruding between said mold parts a parison of said thermoplastic material in the form of a semi-solid, elongated hollow tube;
   (c) closing said assembly of mold parts about said parison so as to confine a portion thereof between said mold parts and within said container-forming cavity while pinching closed one end of the confined parison portion with said mold parts and deforming the other end of said confined parison portion with said constricting means to provide a constriction defining a pair of access apertures in the confined parison portion;

(d) severing a predetermined length of the extruded parison so as to provide an open-ended parison portion above the confined parison portion and unitary therewith;

(e) temporarily sealing one of said access apertures by applying to the deformed parison portion defining said one access aperture a first mandrel equipped with (1) a blowing tube, (2) an extensible compression molding member, and (3) an annular molding surface coacting with said mold parts so as to form a weakened flange about said one access aperture;

(f) extending said compression molding member into said one access aperture so as to form a container neck portion having a bore of predetermined configuration and communicating with said one access aperture;

(g) blow molding said confined parison portion through said blowing tube of said first mandrel so as to produce a container body conforming to the configuration of said mold cavity;

(h) temporarily sealing the other of said access apertures by applying to the deformed parison portion defining said other access aperture a second mandrel equipped with a filling tube and terminating in a ring-like molding ram so as to form a second container neck portion having a bore of predetermined configuration and communicating with said other access aperture;

(i) filling the formed container body with a desired contents from said second mandrel;

(j) removing both of said mandrels from said deformed parison portions;

(k) positioning closure-forming mold parts about said open-ended parison portion; and (l) operating said closure-forming mold parts so as to form individual closures for both of said access apertures unitary with said container body.

3. The method in accordance with claim 2 wherein steps (b) through (l) are repeated to form, fill and seal subsequent containers seriatim without discharging any liquid from said first mandrel.

* * * * *